Aug. 24, 1937.  G. GÜTTEL  2,091,097
METHOD OF STAMPING PRINTING TYPE WITH ALIGNING MARKS
Filed Feb. 12, 1935
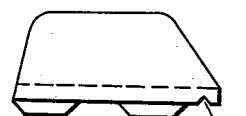
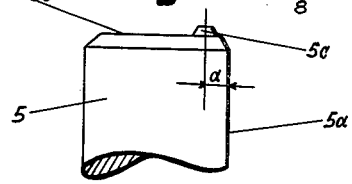
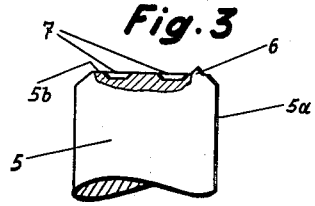
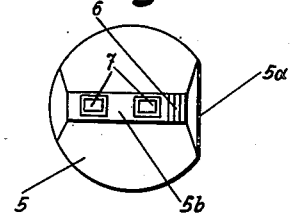
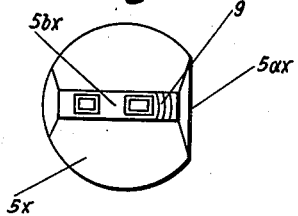
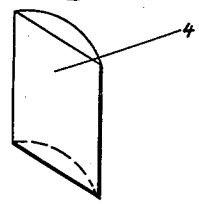
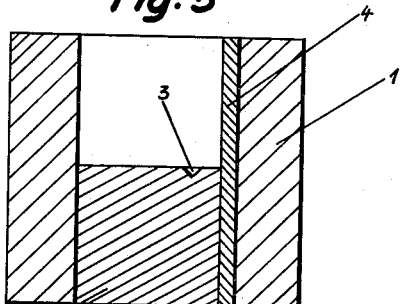
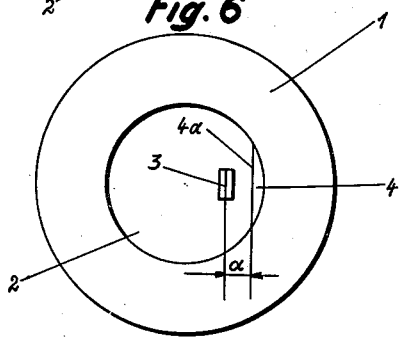
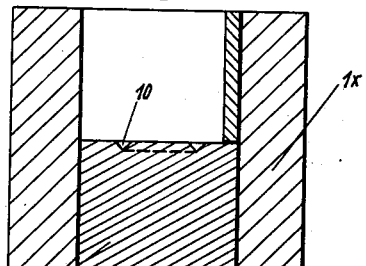
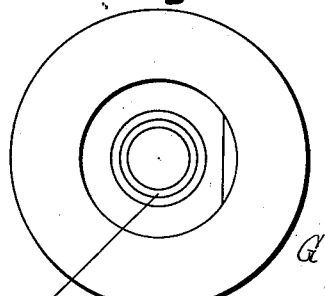

Patented Aug. 24, 1937

2,091,097

UNITED STATES PATENT OFFICE 2,091,097

METHOD OF STAMPING PRINTING TYPE WITH ALIGNING MARKS

Gerhard Güttel, Berlin, Germany, assignor to Iris-Type G. m. b. H., Schoneberg, near Berlin, Germany Application February 12, 1935, Serial No. 6,265
In Germany February 17, 1934

15 Claims. (Cl. 101—401.5)

The invention relates to a method of stamping printing type with aligning marks.

Types are provided with aligning marks in order that, when they are mounted on the type supporting members, such as type levers, type bars, etc., an accurate aligning is obtained so that a re-adjusting of the types is no longer necessary. The accurate production of such type was hitherto found difficult however, because the exact production of the corresponding die or punch was a matter of considerable difficulty owing to the fact that absolute accuracy when milling the aligning mark was impossible, on account of the natural play in the machine, the wearing of the milling cutter and similar occurrences during milling. Particularly were these difficulties felt when types having a recessed aligning mark were to be produced, as the marker had to be produced on the type punch in a completely separate operation, so that owing to the inaccuracies of the machine, it was impossible to produce the marker at an exactly constant distance from the base line of the letter matrix. These difficulties prevented characters with a recessed aligning mark from being produced at all to any appreciable extent. This defect is felt all the more seeing that characters with a recessed aligning mark are better than characters having an aligning mark which is raised or in relief, as the latter has to be removed after aligning. Moreover, it is then necessary for the aligning device to be provided with a corresponding recess, in which dust and possibly also the falling solder from the soldering operation become deposited, so that unless sufficient care is taken, the adjustment may be inaccurate.

Now, according to the invention type characters having an aligning mark are accurately produced by stamping the types by means of a die or punch having a marker, produced by stamping. The type punch used for this purpose, is preferably produced by stamping a marker on the die, whilst at the same time employing a gauge for guiding the die. By employing this method according to the invention it is also possible to produce characters which are provided with a circular arc-shaped aligning mark. These types have the advantage that they also admit of a lateral adjusting.

By way of example, the drawing illustrates a type character produced according to the invention as well as the various devices which serve for producing the type and for producing the punch.

Fig. 1 shows a side elevation of a type character according to the invention.

Fig. 2 shows a punch in the first working stage.

Fig. 3 illustrates the finished punch in side elevation and partial section.

Fig. 4 shows a plan on the punch according to Fig. 3.

Fig. 5 gives a section through a gauge for stamping the raised marker.

Fig. 6 shows a plan on the gauge according to Fig. 5.

Fig. 7 gives the same sectional view through the stamping gauge as Fig. 5 with the difference that here the stamping recess is a complete annulus instead of a short straight length.

Fig. 8 shows a plan on the gauge according to Fig. 7.

Fig. 9 shows a plan on a punch with a raised marker produced in the gauge according to Figs. 7 and 8.

Fig. 10 illustrates a detail portion of the stamping gauge according to Figs. 5 to 8.

As is well known, type characters are produced by stamping with a punch. According as to whether the type is to be provided with a raised or a recessed aligning mark, the punch is furnished with a recessed or a raised marker. In order to produce a raised straight marker on the punch according to the invention a gauge as shown in Figs. 5 and 6 is first of all prepared. In the interest of better production, this consists of a thick-walled sleeve I, in which a stamping matrix 2 is fitted, this matrix being provided with the marker 3. This marker is arranged at a distance $a$ from the aligning face 4a and parallel to same. The aligning face is arranged on an insert 4, which is placed between the stamping matrix 2 and the opposite inner wall of the sleeve I (Figs. 5, 6 and 10). The insert 4 is rigidly connected to the sleeve I. The parts I, 2 and 4 may, of course, also be made in one piece.

The punch 5 (Figs. 2 to 4) is now first of all accurately fitted into the gauge thus formed, that is, so that both its cylindrical outer surface and its aligning face 5a rest with a suctional fit against the inner wall of the sleeve I and the face 4a of the insert 4 respectively.

After this has been done, the face 5b of the die 5 is milled off, so that a raised portion 5c remains behind at approximately the distance $a$ (Figs. 2 and 6) from the aligning face 5a. The die or punch produced in this way is now introduced into the gauge and subjected to repeated pressure action, so that the raised portion 3 is gradually forced into the marker 3, whilst the excess material or the burr forming, is removed. This gradually gives shape to the marker 6, as illustrated in Fig. 3.

After the marker has been accurately made, the punch is passed to the engraving machine and now for the purpose of engraving the letter matrices 7, the aligning face 5a of the punch serves as a resting face.

Therefore, as the marker 6 of all punches is exactly the same distance $a$ from the aligning face 5a of the punch 5, the type base line, whose distance is determined by the aligning face 5a, will also automatically have the same spacing from the marker 6 for all letter matrices.

Consequently, the recessed aligning mark 8 (Fig. 1) stamped with the punches so made has also the same distance from the base line of the type character, this distance being identically the same for all types and with an accuracy hitherto unobtainable.

By means of this process it is now at once possible to produce an arc-shaped aligning mark (Fig. 9) on the punching die.

In this case it is only necessary that the matrix 2x (Fig. 7) for the marker 9—which matrix has preferably not a straight aligning surface—to be provided with an annular recess 10 (Figs. 7 and 8).

When adopting this procedure either the packing piece 4, which extends only to the impression surface of the matrix, is firmly arranged in the sleeve 1x or is loosely inserted in the sleeve 1x along with the die. The adoption of the latter arrangement in conjunction with the annular recess 10 has the advantage that, the marker 9 can be impressed at any place on the circular recess 10, so that the life of the stamping matrix 2x is increased considerably.

Further, the aligning face 5cx on the punch 5x can be dispensed with entirely, that is, it can be formed as a solid cylinder. Any line of the outer cylindrical surface then serves as an aligning edge.

The type produced with an annular marker 9 has also the advantage that it is at the same time fixed in lateral direction on the aligning device, in as much as its possibility of turning is prevented.

With the above-described method it is possible to produce both type with recessed as well as type with raised aligning marks. This is an advantage, as by stamping the marker in the type punch, even when the aligning mark is a raised one, an exceedingly accurate method of manufacture is possible without difficulty.

In this case it is only necessary to arrange a raised marker instead of the recessed marker 3 or 10 in the stamping gauge 5 and to mill the surface 5b or 5x of the punch 5 or 5x absolutely smooth before the imprinting of the marker.

As far as the invention is concerned it is immaterial at what place the marker is provided, although the arranging of same at the end of the type body is preferred. The important thing is however, that the marker for stamping the aligning mark is produced on the punch by stamping.

Having thus described my invention what I claim as new therein and desire to secure by Letters Patent is:—

1. A method of forming printing type characters having aligning marks, which comprises forming a marker for stamping the aligning marks on a punch by stamping and subjecting the type to a stamping operation by the said punch whereby the aligning marks are stamped by the marker.

2. A method of forming printing type characters having aligning marks, which comprises guiding a punch in a gauge, forming by stamping a marker for stamping the aligning marks on the end of the punch and utilizing the punch with its marker formed thereon by stamping for the stamping of the type and the aligning marks thereon.

3. A method of forming printing type characters having recessed aligning marks, which comprises forming a raised marker on a punch by stamping and subjecting the type to a stamping operation by the said punch.

4. A method of forming printing type characters having recessed aligning marks, which comprises guiding a punch in a gauge, forming by stamping a raised marker on the end of the punch and utilizing the punch with its raised marker formed thereon by stamping for the stamping of the type.

5. A method of forming a type punch for producing type characters with aligning marks, which comprises forming a marker thereon by subjecting the punch to repeated applications of pressure alternating with the removal of excess material.

6. A method of forming a type punch for producing type characters with aligning marks, which comprises guiding a punch in a gauge and stamping a marker on the end of the punch by repeated applications of pressure alternating with the removal of excess material.

7. A method of forming a type punch for producing type characters with recessed aligning marks, which comprises guiding a punch in a gauge, and stamping a raised marker on the end of the punch by repeated applications of pressure alternating with the removal of excess material.

8. A method of forming a type punch for producing type characters with aligning marks, which comprises guiding a punch in a thick-walled sleeve fitted with a stamping matrix provided with a notch for stamping a corresponding raised marker on the end of the punch by pressing the punch on said matrix.

9. A method of forming a type punch for producing type characters with recessed aligning marks, which comprises guiding a punch in a thick-walled sleeve fitted with a stamping matrix having a recessed marker, and stamping a raised marker on the end of the punch by repeated applications of pressure to the punch alternating with the removal of excess material.

10. A method of forming a type punch for producing type characters with aligning marks, which comprises guiding a punch in a gauge formed with an aligning face, stamping a marker on the end of the punch by repeatedly pressing the punch on a stamping matrix fitted in said gauge and engraving letter matrices of the type punch with respect to the aligning face used during the stamping of the marker.

11. As a new article of manufacture, a type character having an aligning mark thereon, the said aligning mark being of circular arc shape.

12. As a new article of manufacture, a type character having a recessed aligning mark, the said aligning mark being of arcuate formation.

13. As a new article of manufacture, a type punch for the production of type blocks having characters thereon with aligning marks, the said punch having a raised marker thereon of arcuate formation.

14. A method of forming a marker on a type punch utilizing a matrix having a circular recess consisting in the step of exerting a stamping action with the matrix on the punch for impressing a raised marker on said type punch.

15. As a new article of manufacture, a gauge for guiding a type punch during the formation of a marker on said punch, said gauge including a member separate therefrom and having a straight guiding surface for said punch, said member forming an interponent between said gauge and said punch.

GERHARD GÜTTEL.